(12) United States Patent
Froehlich et al.

(10) Patent No.: US 7,620,505 B2
(45) Date of Patent: Nov. 17, 2009

(54) DEVICE FOR DETERMINING AND/OR MONITORING THE VOLUME, AND/OR MASS, FLOW RATE OF A MEDIUM

(75) Inventors: Thomas Froehlich, Münchenstein (CH); Harald Stocker, Schopfheim (DE); Klaus Bussinger, Reinach (CH)

(73) Assignee: Endress + Hauser Flowtec AG, Reinach (CH)

( * ) Notice: Subject to any disclaimer, the term of this patent is extended or adjusted under 35 U.S.C. 154(b) by 115 days.

(21) Appl. No.: 10/535,674

(22) PCT Filed: Nov. 17, 2003

(86) PCT No.: PCT/EP03/12861

§ 371 (c)(1),
(2), (4) Date: May 22, 2006

(87) PCT Pub. No.: WO2004/046658

PCT Pub. Date: Jun. 3, 2004

(65) Prior Publication Data

US 2006/0243063 A1   Nov. 2, 2006

(30) Foreign Application Priority Data

Nov. 19, 2002   (DE) ............................... 102 54 054

(51) Int. Cl.
*G01F 1/00* (2006.01)

(52) U.S. Cl. ....................................................... 702/45
(58) Field of Classification Search ................... 702/45, 702/48, 50, 54; 73/861, 861.18, 861.23
See application file for complete search history.

(56) References Cited

U.S. PATENT DOCUMENTS

| | | | | | |
|---|---|---|---|---|---|
| 4,787,252 | A | * | 11/1988 | Jacobson et al. | 73/861.28 |
| 5,650,571 | A | * | 7/1997 | Freud et al. | 73/861.06 |
| 5,753,824 | A | * | 5/1998 | Fletcher-Haynes | 73/861.28 |
| 6,626,049 | B1 | * | 9/2003 | Ao | 73/861.29 |
| 6,748,812 | B1 | * | 6/2004 | Takemura et al. | 73/861.29 |
| 6,928,369 | B2 | * | 8/2005 | Kishimoto et al. | 702/45 |
| 7,058,521 | B2 | * | 6/2006 | Kowal et al. | 702/45 |
| 7,194,363 | B2 | * | 3/2007 | Schaffer et al. | 702/60 |
| 2005/0137812 | A1 | * | 6/2005 | Schaffer et al. | 702/60 |

* cited by examiner

*Primary Examiner*—Michael P. Nghiem
*Assistant Examiner*—Cindy H Khuu
(74) *Attorney, Agent, or Firm*—Bacon & Thomas, PLLC

(57) ABSTRACT

An ultrasonic flow measuring device which provides a flow measuring device characterized by a low electrical current consumption and low power uptake. At least one component of high power uptake with a control/evaluation unit is provided, with the control/evaluation unit being designed such that the component of high power uptake is operated intermittently in a measuring phase and in an idle phase, with the component being activated in the measuring phase, while, in the idle phase, the component exhibits a reduced power uptake or is completely turned off.

10 Claims, 2 Drawing Sheets

DEVICE FOR DETERMINING AND/OR MONITORING THE VOLUME, AND/OR MASS, FLOW RATE OF A MEDIUM

FIELD OF THE INVENTION

The invention relates to a device for determining and/or monitoring the volume, and/or mass, flow rate of a medium flowing through a containment in a streaming direction. The device includes at least one ultrasonic transducer, which emits and/or receives ultrasonic measuring signals, and a control/evaluation unit, which determines the volume, and/or mass, flow rate of the medium in the containment on the basis of the ultrasonic measuring signals according to the travel-time-difference principle or according to the Doppler principle.

BACKGROUND OF THE INVENTION

Ultrasonic flow measuring devices are applied often in process and automation technology. They enable contactless determination of the volume, and/or mass, flow rate of a medium in a containment, especially in a pipe.

Known ultrasonic measuring devices work either by the Doppler principle or the travel-time-difference principle. In the case of the travel-time-difference principle, the different travel time of the ultrasonic measuring signals in the direction of medium flow, and counter to the direction of medium flow, is exploited. To this end, the ultrasonic measuring signals are alternatingly issued, and received, in the direction of flow, and counter to the direction of flow. On the basis of the travel-time-difference of the ultrasonic measuring signals, the flow velocity can be determined, and, with that and known diameter of the pipe, the volume flow rate of the medium, or, with known density, the mass flow rate of the medium.

In the case of the Doppler principle, ultrasonic measuring signals of known frequency are coupled into the flowing medium. The ultrasonic measuring signals reflected in the medium are evaluated.

On the basis of a frequency shift occurring between the ultrasonic measuring signal which was coupled into the medium and the reflected ultrasonic measuring signal, likewise the flow velocity of the medium, or the volume, and/or mass, flow rate, can be determined. The use of flow measuring devices working according to the Doppler principle is only possible, when present in the medium are air bubbles or impurities, on which the ultrasonic measuring signals are reflected. Thus, the application of ultrasonic flow measuring devices using the Doppler principle is rather limited, compared to ultrasonic flow measuring devices using the travel-time-difference principle.

With respect to types of measuring devices, a distinction is drawn between ultrasonic flow measuring pickups that are inserted into the pipeline, and those known as clamp-on flow measuring devices, where the ultrasonic transducers are pressed onto the pipeline externally by means of a clamp. Clamp-on flow measuring devices are described, for example, in EP 0 686 255 B1, U.S. Pat. No. 4,484,478 or U.S. Pat. No. 4,598,593.

In both types of ultrasonic flow measuring devices, the ultrasonic measuring signals are radiated at a predetermined angle into, and/or received from, the pipe containing the flowing medium. In order to be able to radiate the ultrasonic measuring signals at a determined angle into, and out of, the pipe, or into, and out of, the medium, the in- and out-coupling of the ultrasonic measuring signals occurs in clamp-on flow measuring devices via an interface piece, or coupling wedge.

For achieving an optimum impedance matching, it is, moreover, known to make the coupling wedges of a suitably refracting material, e.g. a synthetic material, or plastic. Principal component of an ultrasonic transducer is usually at least one piezoelectric element, which produces the ultrasonic measuring signals and/or receives them.

It is clear that the ultrasonic measuring signals are received strongly attenuated after passing through the medium and, in the case of clamp-on measuring devices, also through the pipe wall and, as the case may be, due to unfavorable impedance ratios in the in-coupling and out-coupling, respectively, into and out of the medium. In order to obtain usable measurement results, the received ultrasonic measuring signals must, therefore, be suitably amplified. The amplification lies usually in a range of 20-120 dB. The frequency of ultrasonic measuring signals lies in the range of about 100 kHz to 10 MHz. Electronic components working in this frequency range have a relatively high electrical current consumption, i.e. take a relatively high power.

SUMMARY OF THE INVENTION

An object of the invention is to provide a flow measuring device distinguished by a low electrical current consumption, i.e. a low power uptake.

The object is achieved by associating at least one component of high power uptake with the control/evaluation unit and by designing the control/evaluation unit such that the component of high power uptake is operated intermittently in a measuring phase and in an idle phase. In the measuring phase, the component of high power uptake is activated, while it has a reduced power uptake in the idle phase or is even turned off. As already mentioned earlier, the flow measuring device can be a clamp-on flow measuring device or it can be a measuring device which can be placed within the pipe. In the case of the component of high power uptake, such can be, for example, an amplifier, an analog/digital converter, a microprocessor or a programmable logic-component. According to the invention, it is possible to strobe a component with high power consumption in such a manner that the energy supply of the ultrasonic flow measuring device is assured.

By intentionally turning off only one component, the flow measuring device is ready to operate significantly faster upon the turning of such component back on, than if the power supply for the measuring device had been the component which was strobed. Thus, the turning of the power supply on and off would take a longer time, since, following a shutdown of the flow measuring device, a certain amount of time is always required, before a stable voltage can be available for operating the flow measuring device again. A further advantage of the component-wise strobing of the flow measuring device is to be seen, moreover, in the fact that the measuring performance, i.e. the number of measurements per unit time, is not decreased, as compared with non-strobed, continuous operation. Therefore, it is possible with the solution of the invention to perform a continuous measuring, despite the strobing of individual components.

An advantageous further development of the device of the invention provides at least one component having a switching function, with such component activating, or deactivating, at least one component of high power consumption. An example of a component having a switching function is a semiconductor switch.

An especially favorable embodiment of the device of the invention provides that, integrated into the component of high power takeup, is a mechanism for decreasing the current consumption, or power takeup. With this, an amplifier can be placed in a current-saving mode; a microprocessor can be placed in a sleep mode.

According to an advantageous further development of the device of the invention, it is provided that the time span between two successive measuring, or idle, phases of the component of high power uptake and/or the duration of a measuring, and/or an idle, phase of the component of high power uptake is/are predetermined. An alternative form of embodiment provides an input unit, via which the time span between two successive measuring, or idle, phases of the component of high power takeup and/or the duration of a measuring, and/or idle, phase of the component of high power takeup is predeterminable.

An especially favorable variant provides that the control/evaluation unit determines the travel time of the measuring signals on the basis of predetermined system and/or process variables and specifies the time span between two successive measuring, or idle, phases of the component of high power takeup and/or the duration of a measuring, and/or idle, phase of the component of high power takeup, as a function of the determined travel time. Since, in this kind of specification of the measuring and idle phases, the characteristics existing at the measurement site are taken into consideration, this enables an optimal energy savings to be achieved, savings tuned to the particular application.

In certain applications, it can happen that, in spite of the strobing of the component(s) of high power requirement, the available energy is still not sufficient. In this case, an advantageous further development of the device of the invention provides that the control/evaluation unit determines the travel time of the measuring signals on the basis of predetermined system and/or process variables; additionally, the time span between two successive measuring, or idle, phases of the component of high power takeup and/or the duration of a measuring, and/or idle, phase of the component of high power takeup, is predetermined as a function of the determined travel time and as a function of the energy which is available.

Moreover, an advantageous embodiment of the device of the invention provides that assigned to the control/evaluation unit is an energy storage element, which is designed such that it can store at least the energy required in the measuring phase for operating the components of the control/evaluation unit, or of the flow measuring device, as the case may be.

BRIEF DESCRIPTION OF THE DRAWINGS

The invention will now be explained in greater detail on the basis of the drawings, the figures of which show as follows.

DESCRIPTION OF THE PREFERRED EMBODIMENTS

Figure 1:
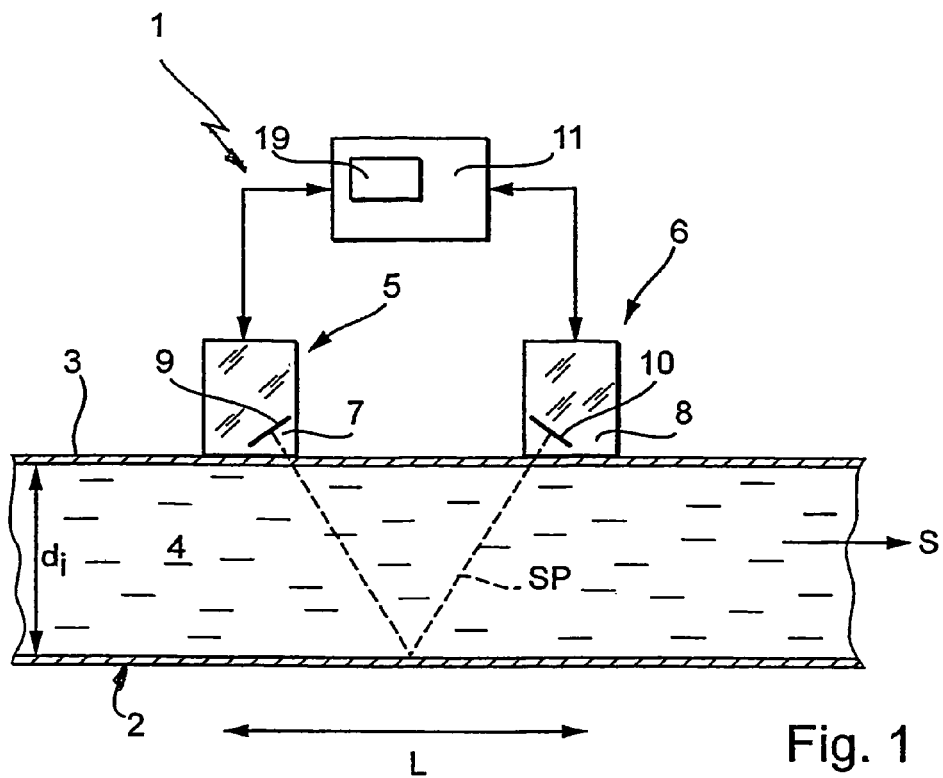
FIG. 1 a schematic drawing of an embodiment of the ultrasonic flow measuring device of the invention.

FIG. 1 is a schematic drawing of an embodiment of the ultrasonic flow measuring device 1 of the invention. The measuring device 1 is a clamp-on flow measuring device. In the illustrated case, the measuring device 1 determines the volume flow rate, or the mass flow rate, of the medium 4 according to the known travel-time-difference method.

Essential components of the clamp-on ultrasonic flow measuring device 1 are the two ultrasonic transducers 5, 6 and the control/evaluation unit 11. The two ultrasonic transducers 5, 6 are mounted on the wall 3 of the pipe 2 at a distance L from one another by means of securement equipment not separately shown in FIG. 1. Appropriate securement devices are sufficiently known from the state of the art and are available from Endress+Hauser. The medium 4 flows through the pipe 2 of inner diameter di in the streaming direction S.

The ultrasonic transducers 5, 6 have as an essential component at least one piezoelectric element 9, 10, which produces and/or receives the ultrasonic measuring signals. The ultrasonic measuring signals are coupled via the coupling wedges 7, 8 into and out of the pipe 2 containing the flowing medium 4. A coupling wedge 7, 8 is designed in a known manner such that a best possible impedance matching is obtained in the transition from one substance into the other. The ultrasonic measuring signals propagate in the pipe 2 and medium 4 along the sound path SP. In the illustrated case, a so-called two-traverse arrangement of the ultrasonic transducers 5, 6 is shown. One traverse is that part of the sound path SP in which an ultrasonic measuring signal crosses the containment pipe 2 one time. The traverses can, depending on the arrangement of the ultrasonic transducers 5, 6 and, as required, with the introduction of a reflector element into the sound path SP, run diametrally or along chords.

The separation L of the two ultrasonic transducers 5, 6 is dimensioned, to the extent possible, such that a large part of the energy radiated into the pipe 2 from one particular ultrasonic transducer 5, 6 is received by the other ultrasonic transducer. The optimum separation L of the two ultrasonic transducers 5, 6 is a function of a number of system and process variables. If these variables are known, then the optimum separation L of the ultrasonic transducers 5, 6 can be calculated highly accurately using the travel time of the ultrasonic measuring signals. Snell's Law is used in a known manner in the calculation. Especially relevant, as concerns the system and process variables are the inner diameter di of the pipe 2, the thickness w of the pipe wall 3, the velocity of sound cP in the material of the pipe 2, or the velocity of sound cM in the medium 4.

Figure 2:
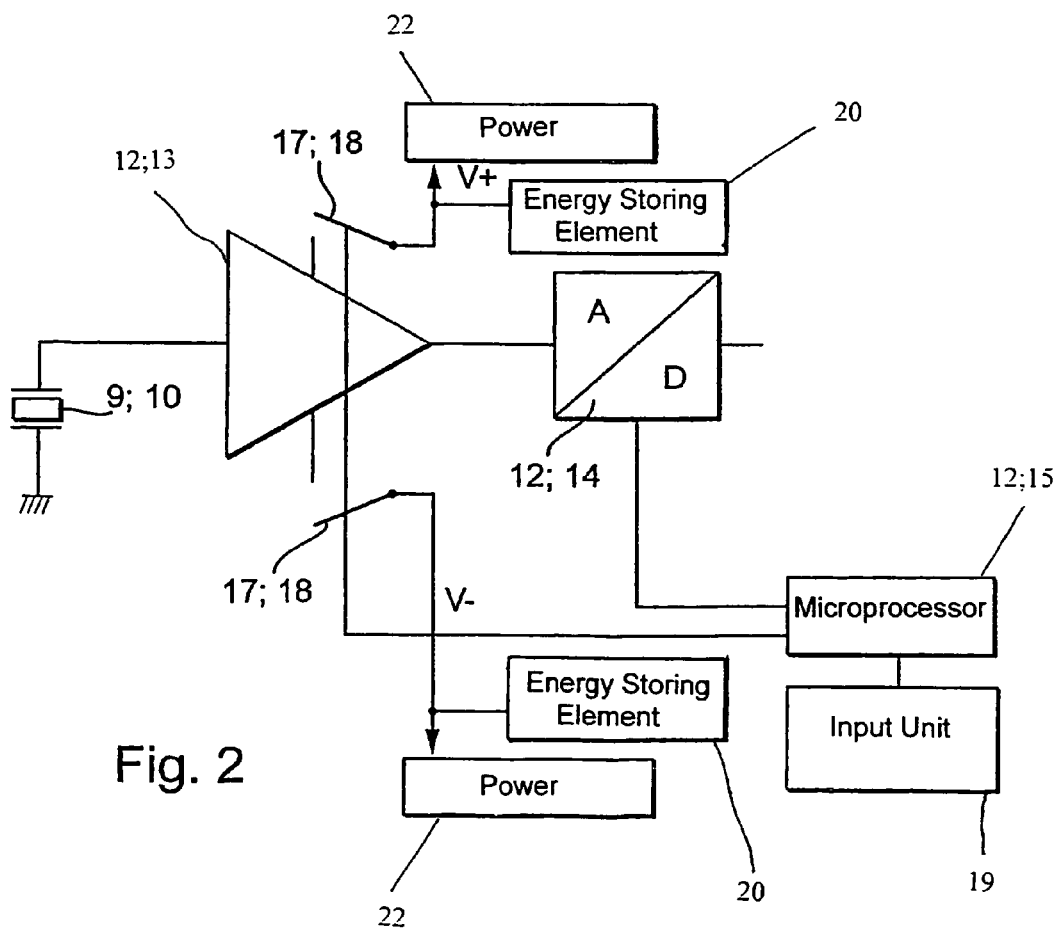
FIG. 2 a block diagram of a first form of embodiment of the device of the invention.
Figure 3:
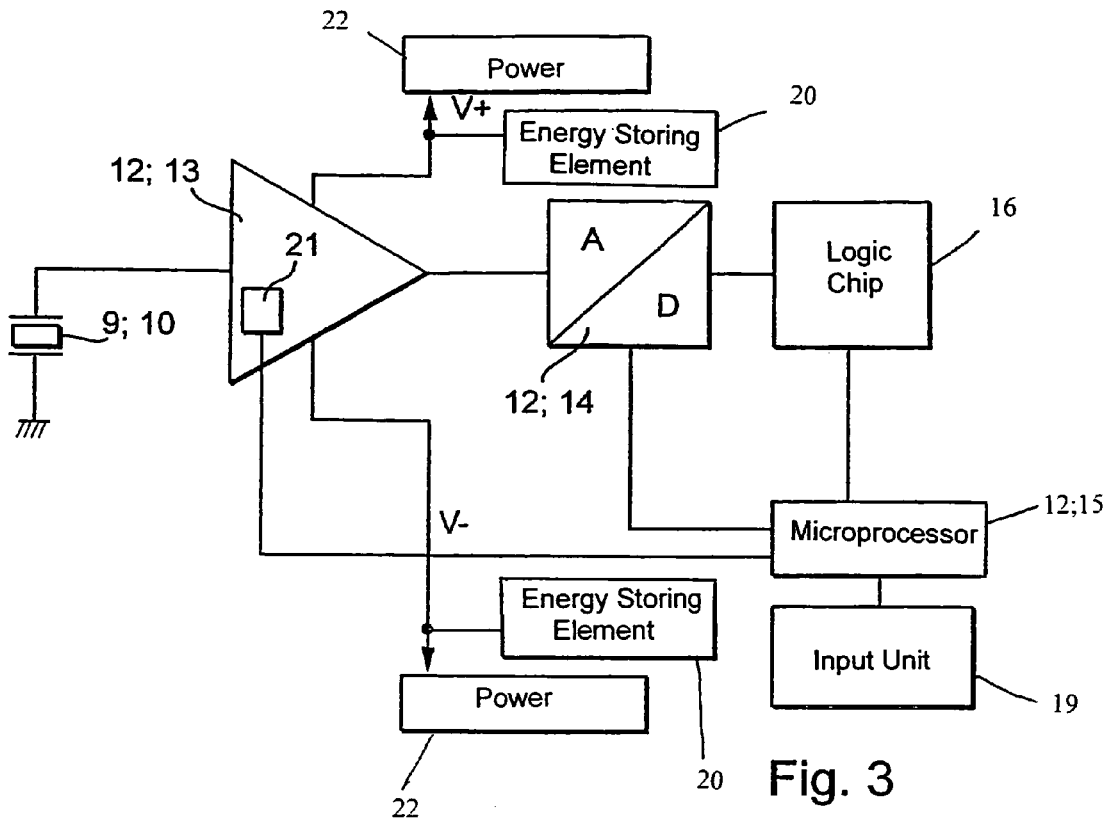
FIG. 3 a block diagram of a second form of embodiment of the device of the invention.

FIG. 2 is a block diagram of a first form of embodiment of the device of the invention; FIG. 3 shows a block diagram of an alternative form of embodiment. The two block diagrams are greatly simplified: Thus, the device for exciting the sensors (transducers) (emitting stage) has been omitted. A likewise usually present multiplexer serving for switching the sensors has also not been drawn.

It was explained above that, depending on characteristics of the sound path SP, the received ultrasonic measuring signals must be amplified, in order that the flow measuring device 1 can deliver usable and reliable measuring results. The required amplification lies usually in the range of 20-120 dB. Since the frequency of the ultrasonic measuring signals is in the range of about 100 kHz to 10 MHz, naturally, electronic components must be used for the amplification of the ultrasonic measuring signals that work in this frequency range. Such components are characterized by a relatively high electrical current consumption, i.e. a relatively high power uptake. It is here that the invention comes in.

The ultrasonic measuring signals received by the piezoelectric elements 9, 10 are amplified in the amplifier 13 using a suitable amplification factor. Subsequently, the ultrasonic measuring signals are digitized by the analog/digital converter 14 and forwarded to a microprocessor for evaluation.

The evaluation can be done, for example, by the microprocessor 15. The mentioned components are associated with a control/evaluation unit 11. If all components worked continuously, their power requirement per unit time would exceed the maximum available energy. According to the invention, the control/evaluation unit 11 is designed such that at least one component 12 of high power takeup is operated intermittently in a measuring phase and in an idle phase. In the measuring phase, the component 12 of high power uptake is activated, while it exhibits a reduced power uptake, or is turned completely off, in the idle phase. FIGS. 2 and 3 relate to the case where the component 12 of high power uptake is the amplifier 13 and/or the analog/digital converter 14. The microprocessor strobes the amplifier 13 and/or the analog/digital converter 14 such that it/they is/are active only during the measuring phase $t_2$; during the idle phase $t_1$, the amplifier 13 and/or the analog/digital converter 14 is/are deactivated.

In the case of the embodiment of FIG. 2, the strobing of the amplifier 13 occurs by way of the switch 18 operated by the microprocessor 15. Switch 18 is, for example, a semiconductor switch. It is possible that the analog/digital converter is turned on and off by the switching of the strobe on and off. In the case of the form of embodiment shown in FIG. 3, the strobing of the amplifier 13 occurs via a component 21 integrated into the amplifier 13 and serving for reducing the power uptake of the amplifier 13. The strobed operating of the component 21 is done by the microprocessor 15.

The component 21 places the amplifier in a current-saving mode (e.g. a sleep mode) in a predetermined and/or calculated rhythm. The placing of the component 12 of high power uptake into the current-saving mode can occur either via interruption of the supply of power (in FIG. 2, the supply of power to the amplifier 13 is interrupted by actuation of the switch 18) or a sampling strobe, and no sampling strobe, are alternatingly applied to the pertinent component 12, e.g. the A/D converter 14. In the case of the last-mentioned option, use is made of the circumstance that electrical current consumption usually scales with the frequency of the applied strobe. Thus, this embodiment is especially advantageous. Furthermore, the power uptake of e.g. the logic component 16 can also be controlled via the switching of the strobe on and off.

FIG. 3 shows the case where, besides the amplifier 13, also the A/D converter 14 and the logic chip 16 can be strobed. In principle, strobing is only done, when the available energy is not sufficient. This is especially the case, when the ultrasonic measuring device 1 is connected via a two-wire line with a remote control location and is supplied with energy, power, from the control location via the same two-wire line.

The logic chip is, for example, a programmable logic device PLD. Programmable logic chips 16 are preferably used, when the components to be strobed need to be rapidly turned on. By using the logic chip, the microprocessor 15 itself is unloaded. In particular, all operations which must be performed rapidly are preferably implemented in hardware in the logic chip 16 and not in software. A further variant provides that a processor core and the necessary, rapid logic functions are implemented by the developer itself in an appropriate, programmable component. This variant goes under the heading SoPC (system on a programmable chip). If a PLD or an SoPC is associated with the microprocessor, then, in an embodiment of the device of the invention, it is also possible, depending on application, to strobe at least this one component of the microprocessor, while the remaining component (s) is/are continuously supplied with power.

As already mentioned, instead of the semiconductor switch 18, a mechanism 21 for reducing current consumption, or for interrupting current uptake, is directly integrated into the amplifier 13 in FIG. 3. In this way, amplifier can easily be shifted into an electrical current saving mode.

Both FIGS. 2 and 3 include, moreover, an energy storing element 20, especially a capacitor. This energy storing element 20 is activated, when, in spite of the strobing of the component 12 of high current consumption, the available energy is still not sufficient for operating the flow measuring device 1. The input/display unit 19 provides the interface for use by operating personnel.

Figure 4:
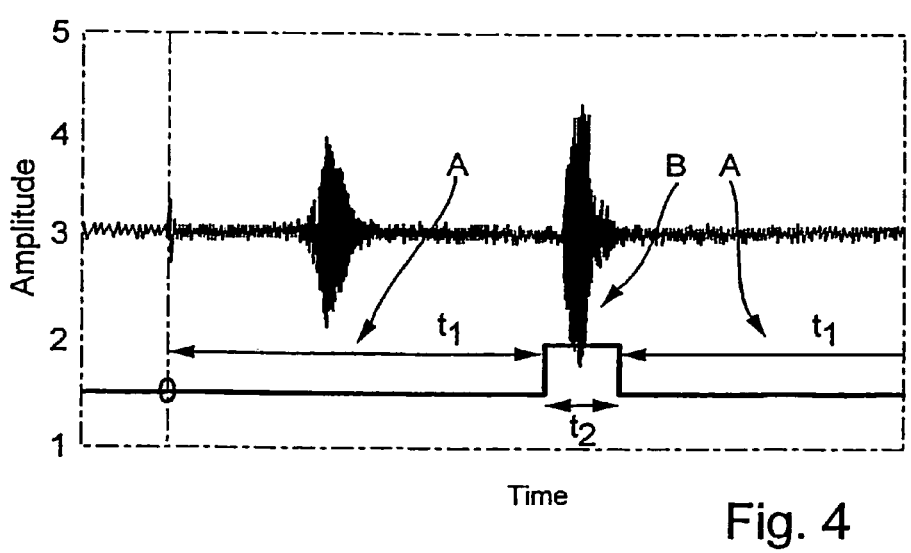
FIG. 4 a travel-time diagram of an ultrasonic measuring signal, illustrating the manner in which the device of the invention acts.

FIG. 4 illustrates the operation of the device of the invention on the basis of a travel-time diagram. The ultrasonic measuring signal leaves the ultrasonic transducer 5, 6 at time '0' and propagates, on the one hand, through the pipe wall (first peak) and, on the other hand, through the medium 4 (second peak). FIG. 4 also shows the typical appearance of a travel time diagram for the two-traverse arrangement of the ultrasonic transducers 5, 6 in FIG. 1.

In order that the second peak, thus the ultrasonic measuring signal representing the flow velocity of the medium 4, can be evaluated, the amplifier 13 must be activated during the duration $t_2$ of the so-called measuring phase. The measuring phase is bordered by the so-called idle phase, in which the amplifier 13 is deactivated. The idle phase lasts for the duration $t_1$. The duration $t_1$ of the idle phase and the duration $t_2$ of the measuring phase are adjusted with respect to one another such that at least the ultrasonic measuring signals containing the information concerning the flow velocity of the medium 4 are received. Usually, the pulse length of an ultrasonic measuring signal is about 10 μsec. Usual pulse repetition rates lie in the order of magnitude of a few milliseconds. According to the invention, the component 12 of high power takeup, here the amplifier 13, is activated only during the period of time $t_2$, when the ultrasonic measuring signal is arriving at the particular one of the ultrasonic transducers 5, 6 serving as the receiver. In this way, the average current consumption, or the average power consumption, is reduced in the ratio of the on/off periods $t_2/t_1$. If the on period $t_2$ amounts to 50 μsec and the off period $t_1$ is 5 msec, then a power savings of 100-times results, as compared to continuous operation.

The travel time of the ultrasonic measuring signal can either be measured or calculated. A calculation of the travel time is possible, at least to an approximation, when the geometric data of the pipe ($d_i$ and w), together with the acoustic properties of the pipe and the medium ($c_P$ and $c_M$), are known. Used in the calculation is Snell's Law.

The invention claimed is:

1. A flow measuring device for determining and/or monitoring the volume, and/or mass, flow rate of a medium flowing through a containment in a streaming direction, comprising:
   at least one ultrasonic transducer, which emits and/or receives ultrasonic measuring signals; and
   a control/evaluation unit, which determines the volume, and/or mass, flow rate of the medium in the containment on the basis of the ultrasonic measuring signals according to the travel-time-difference principle or according to the Doppler principle, wherein:
   associated with said control/evaluation unit is at least one component of high power uptake;
   said control/evaluation unit is embodied such that said at least one component of high power uptake is operated intermittently in a measuring phase and in an idle phase, wherein said at least one component is activated in the measuring phase, while said at least one component has a reduced power uptake, or is turned off, in the idle phase, and the time span between two successive measuring, or idle, phases of said at least one component of high power uptake and/or the duration of a measuring phase ($t_2$) and/or the duration of an idle phase ($t_1$) of said at least one component of high power uptake is/are predetermined.

2. The flow measuring device as claimed in claim 1, wherein:
the flow measuring device is a clamp-on flow measuring device or a measuring device which can be placed within the containment.

3. The flow measuring device as claimed in claim 1, wherein:
said at last one the component of high power uptake is one of: an amplifier, an analog/digital converter, a microprocessor or a logic chip.

4. The flow measuring device as claimed in claim 3, wherein:
a mechanism for decreasing current consumption is integrated into said at least one component of high power takeup.

5. The flow measuring device as claimed in claim 1, further comprising:
at least one component having a switching function, said at least one component having the switching function activates, or deactivates, said at least one component of high power uptake.

6. The flow measuring device as claimed in claim 5, wherein:
said at least one component having a switching function comprises a semiconductor switch.

7. The flow measuring device as claimed in claim 1, further comprising:
an energy storage element associated with said control/evaluation unit, which is sized such that it can at least store the energy required in the measuring phase.

8. A flow measuring device for determining and/or monitoring the volume, and/or mass, flow rate of a medium flowing through a containment in a streaming direction, comprising:
at least one ultrasonic transducer, which emits and/or receives ultrasonic measuring signals; and
a control/evaluation unit, which determines the volume, and/or mass, flow rate of the medium in the containment on the basis of the ultrasonic measuring signals according to the travel-time-difference principle or according to the Doppler principle; and
an input unit, via which the time span between two successive measuring, or idle, phases of said at least one component of high power takeup and/or the duration of a measuring phase ($t_2$) and/or the duration of an idle phase ($t_1$) of said at least one component of high power takeup is predeterminable, wherein:
associated with said control/evaluation unit is at least one component of high power uptake; and
said control/evaluation unit is embodied such that said at least one component of high power uptake is operated intermittently in a measuring phase and in an idle phase, wherein said at least one component is activated in the measuring phase, while said at least one component has a reduced power uptake, or is turned off, in the idle phase.

9. A flow measuring device for determining and/or monitoring the volume, and/or mass, flow rate of a medium flowing through a containment in a streaming direction, comprising:
at least one ultrasonic transducer, which emits and/or receives ultrasonic measuring signals; and
a control/evaluation unit, which determines the volume, and/or mass, flow rate of the medium in the containment on the basis of the ultrasonic measuring signals according to the travel-time-difference principle or according to the Doppler principle, wherein:
associated with said control/evaluation unit is at least one component of high power uptake;
said control/evaluation unit is embodied such that said at least one component of high power uptake is operated intermittently in a measuring phase and in an idle phase, wherein said at least one component is activated in the measuring phase, while said at least one component has a reduced power uptake, or is turned off, in the idle phase; and
said control/evaluation unit determines the travel time of the measuring signals on the basis of predetermined system and/or process variables and specifies the time span between two successive measuring, or idle, phases of said at least one component of high power takeup and/or the duration of a measuring phase ($t_2$) and/or the duration of an idle phase ($t_1$) of said at least one component of high power takeup, as a function of the determined travel time.

10. A flow measuring device for determining and/or monitoring the volume, and/or mass, flow rate of a medium flowing through a containment in a streaming direction, comprising:
at least one ultrasonic transducer, which emits and/or receives ultrasonic measuring signals; and
a control/evaluation unit, which determines the volume, and/or mass, flow rate of the medium in the containment on the basis of the ultrasonic measuring signals according to the travel-time-difference principle or according to the Doppler principle, wherein:
associated with said control/evaluation unit is at least one component of high power uptake;
said control/evaluation unit is embodied such that said at least one component of high power uptake is operated intermittently in a measuring phase and in an idle phase, wherein said at least one component is activated in the measuring phase, while said at least one component has a reduced power uptake, or is turned off, in the idle phase; and
said control/evaluation unit determines the travel time of the measuring signals on the basis of predetermined system and/or process variables, and said control/evaluation unit predetermines the time span between two successive measuring, or idle, phases of said at least one component of high power takeup and/or the duration of a measuring phase ($t_2$) and/or the duration of an idle phase ($t_1$) of said at least one component of high power takeup, as a function of the determined travel time and as a function of the energy which is available.

* * * * *

UNITED STATES PATENT AND TRADEMARK OFFICE
CERTIFICATE OF CORRECTION

PATENT NO.        : 7,620,505 B2                                   Page 1 of 1
APPLICATION NO.   : 10/535674
DATED             : November 17, 2009
INVENTOR(S)       : Froehlich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 380 days.

Signed and Sealed this

Fourteenth Day of December, 2010

David J. Kappos
*Director of the United States Patent and Trademark Office*